Figure 1:
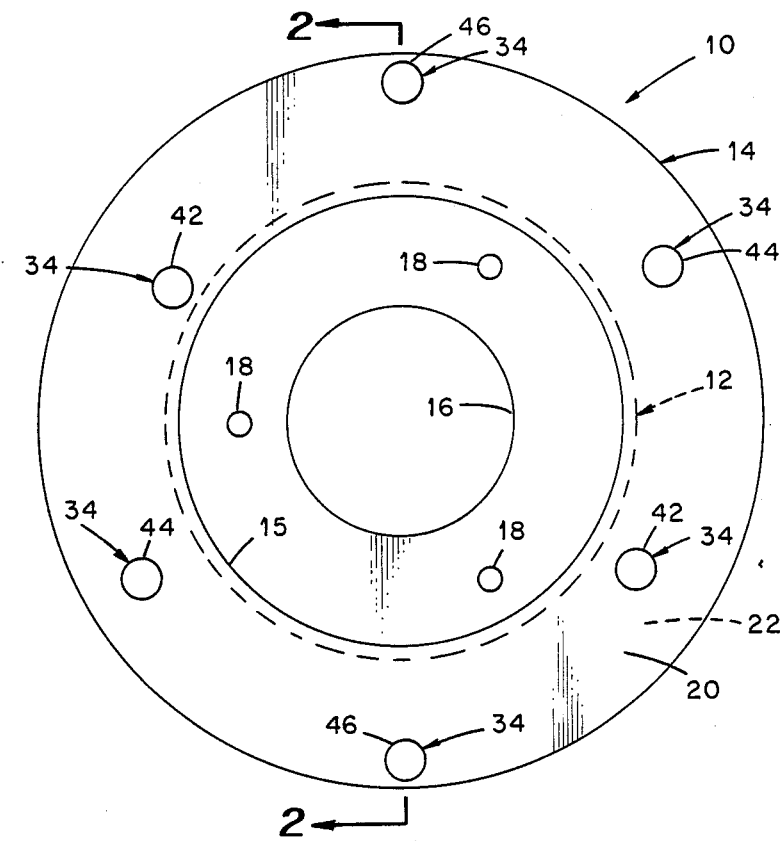

United States Patent [19]

McMurray

[11] Patent Number: 4,756,392
[45] Date of Patent: Jul. 12, 1988

[54] STAINLESS STEEL BRAKE ROTOR FOR AIRPLANE DISK BRAKES

[75] Inventor: Daniel K. McMurray, Weber City, Va.

[73] Assignee: Appalachian Accessories, Inc., Blountville, Tenn.

[21] Appl. No.: 935,239

[22] Filed: Nov. 26, 1986

[51] Int. Cl.[4] ............................................. F16D 65/10
[52] U.S. Cl. ........................ 188/218 XL; 188/251 M; 188/264 A; 192/107 R
[58] Field of Search ..................... 188/250, 251, 18 A, 188/264 A, 264 AA, 73.2, 73.1, 218 XL, 218 R, 218 A, 73.35, 73.45; 192/113, 107, 70.12, 70.14; 75/0.5 BC; 148/11.5 R, 11.5 F, 145, 150, 153, 156; 72/334, 342

[56] References Cited

U.S. PATENT DOCUMENTS

| 1,912,716 | 6/1933 | Lane | 188/218 XL |
|---|---|---|---|
| 2,727,594 | 12/1955 | Ganster, Jr. | 188/218 XL |
| 2,728,421 | 12/1955 | Butler | 188/218 XL |
| 3,301,356 | 1/1967 | Pompa | 188/218 XL |
| 3,393,775 | 7/1968 | Hollins | 188/218 XL |
| 3,623,577 | 11/1971 | Scharlack | 188/218 XL X |
| 3,805,935 | 4/1974 | Armstrong | 192/113 A |
| 3,809,192 | 5/1974 | Stehle | 188/218 XL |
| 3,884,676 | 5/1975 | Nadkarni et al. | 75/0.5 BC |
| 3,988,913 | 11/1976 | Metcalfe et al. | 72/342 X |
| 4,066,116 | 1/1978 | Blazek et al. | 164/17 |
| 4,081,019 | 3/1978 | Kulig | 164/34 |
| 4,123,301 | 10/1978 | Pope et al. | 148/156 X |
| 4,167,846 | 9/1979 | Shaw et al. | 148/145 X |
| 4,286,694 | 9/1981 | Wiseman, Jr. et al. | 188/218 XL X |
| 4,356,717 | 11/1982 | Okunishi et al. | 72/334 X |
| 4,379,501 | 4/1983 | Hagiwara et al. | 188/218 XL |
| 4,418,798 | 12/1983 | Johannesen et al. | 188/73.45 |
| 4,448,291 | 5/1984 | Ritsema et al. | 188/218 XL |

FOREIGN PATENT DOCUMENTS 2110482  9/1972  Fed. Rep. of Germany ...... 188/264 AA Primary Examiner—Douglas C. Butler
Attorney, Agent, or Firm—Luedeka, Hodges & Neely

[57] ABSTRACT

A stainless steel rotor for aviation applications has a preferred Rockwell Hardness of about 30 to about 35 to provide a suitable braking action. The adverse effects of galling are minimized through the provision of depressions on the braking surfaces of the rotor. Metal that is deformed on the braking surfaces or is separated therefrom as a result of frictional contact between the braking surfaces and the brake pads is moved into the depressions under the influence of the pads to keep the surfaces substantially free of deformations and accumulations of loose metal due to galling.

7 Claims, 1 Drawing Sheet

U.S. Patent

Jul. 12, 1988

4,756,392

STAINLESS STEEL BRAKE ROTOR FOR AIRPLANE DISK BRAKES

The present invention relates to brake rotors for airplane disk brakes and more particularly relates to a stainless steel brake rotor for airplane disk brakes which is adapted to minimize the adverse effects of galling on the braking surfaces of the rotor.

Brake rotors for aviation use are subjected to extreme mechanical and thermal stresses not normally encountered by rotors used in land vehicles. Rapid heating of the braking surfaces of the rotors can carbonize and distort the rotors, especially in the case of heavier planes landing at high speeds. Conventional brake rotors for aviation use have been constructed of carbon steel specially formulated and treated to withstand these severe conditions and often have vanes, recesses, slots and the like to increase airflow around the brakes and aid in dissipating heat from the rotors. However, corrosion problems with these rotors have proven them to be less than satisfactory, especially regarding brake rotors that are used infrequently or are exposed to salt water as in the case of sea planes.

In an attempt to overcome corrosion problems with airplane brake rotors, various corrosion resistant metals have been proposed but have met with only limited success. For example, chrome plated steel has been used but due to the severity of the braking conditions, the chrome plating has been found to crack or distort resulting in corrosion of the undersurface, buckling of the plating, etc. Various stainless steel compositions have been tried but have been found unsuitable. In particular, the harder stainless steels do not provide an adequate braking action because the braking surfaces are too slick to achieve the necessary degree of frictional contact between the surfaces and the pads. Softer stainless steels, while capable of providing adequate braking action, quickly become unsuitable through use due to the problem of galling or metal deformation and separation on the braking surfaces. While it is believed that galling in these softer stainless steels could be reduced by increasing the braking surface area in relation to the total plane weight, this option has not been seriously considered because it would require the use of larger, heavier brakes which would unduly increase the weight of the airplane.

Accordingly, it is an object of the present invention to provide a stainless steel brake rotor for aviation use which is capable of providing an adequate braking action.

A further object of the invention is to provide a stainless steel brake rotor of the character described which includes provision for minimizing the adverse effects of galling on the braking surfaces of the rotor.

Another object of the invention is to provide a stainless steel brake rotor of the character described which is integrally formed of a single casting in a size and weight that is compatible with existing airplane disk brake assemblies.

Figure 2:
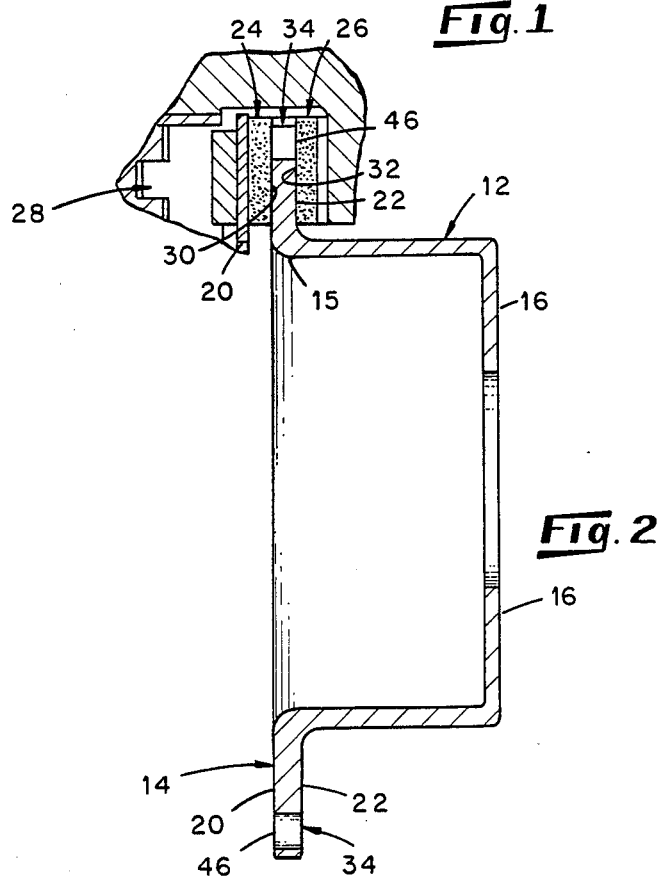
Figure 3:
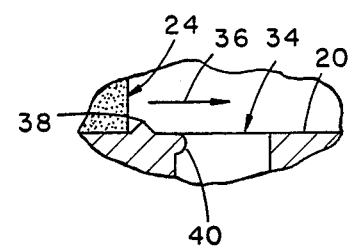

The above and other object and advantages of the present invention will be better understood by reference to the following description of a preferred embodiment when considered in conjunction with the accompanying drawings in which:

FIG. 1 is a top plan view of a brake rotor illustrating features of a preferred form of the invention;

FIG. 2 is a view along line 2—2 of the rotor shown in FIG. 1 with a portion of an airplane wheel and disk brake assembly added to illustrate the interaction of the rotor with brake pads of the assembly to provide a braking force; and FIG. 3 is a diagrammatic view illustrating deformation of metal on the braking surfaces of the rotor and one of a plurality of depressions formed on the braking surfaces, the metal being moved into the depression by a brake pad moving across the depression on the braking surface.

In general, the present invention includes a brake rotor for use in an airplane wheel and disk brake assembly having brake pads with rotor-contacting surfaces which interact with the brake rotor to provide a braking force. The rotor comprises a hub for connecting the rotor to the wheel for rotation therewith about a hub axis, and a disk connected to the hub and defining substantially planar annular braking surfaces on opposite axial sides thereof for frictionally contacting the rotor-contacting surfaces of the brake pads to provide the braking force. The hub and disk are preferably integrally formed of stainless steel that has a minimum tensile strenth of about 120,000 p.s.i. and a Rockwell Hardness of from about 30 to about 42.

A plurality of spaced-apart depressions are provided on the braking surfaces and are dimensioned and arranged so that the rotor-contacting surfaces of the pads cross at least one of the depressions on the braking surfaces at substantially all points on the rotor-contacting surfaces of the pads during rotation of the rotor about the hub axis. Metal that is deformed on the braking surfaces or is separated therefrom as a result of frictional contact between the rotor-contacting surfaces of the pads and the braking surfaces is moved into the depressions under the influence of the pads as they cross the depressions to minimize the adverse effects of galling on the braking surfaces.

The present invention of a brake rotor for aviation use employs a stainless steel which provides adequate braking action and in addition includes provision for reducing the adverse effects of galling on the stainless steel braking surfaces. Metal which would otherwise deform on the surfaces and produce disturbing surface deformations or separate from the surfaces and accumulate between the pads and the surfaces is moved into the depressions under the influence of the brake pads. As a consequence, advantage may be taken of the excellent corrosion resistance of stainless steel.

Referring now to the drawings in which like reference characters designate like or similar parts throughout the several views, a brake rotor 10 is shown illustrating features of a preferred embodiment of the present invention. As will be described, the rotor 10 is formed of stainless steel to produce a brake rotor for aviation use that has excellent corrosion resistance. The rotor 10 is adapted for use with conventional airplane wheel and disk brake assemblies having one or more pairs of opposed brake pads with rotor-contacting surfaces that interact with brake rotors to provide a braking force.

The rotor 10 includes a cylindrical hub portion 12 and an annular disk portion 14. The disk 14 is disposed substantially perpendicular to the axis of the hub 12 which project axially from a center opening 15 of the disk 14. The rotor 10 may also include a radially inwardly directed annular flange 16 on the outboard end of the hub 12 which contains a plurality of bolt holes 18 for receiving bolts to mount the rotor 10 on the wheel of an airplane wheel and disk brake assembly in a conventional fashion. The flange 16 is disposed in a plane that is substantially parallel to the disk 14.

In the preferred embodiment, the disk 14 defines substantially parallel braking surfaces 20 and 22 on opposite axial sides of the disk 14. The surfaces 20 and 22 are planar and annular in configuration, and are separated by the thickness of the disk 14. The respective planes of the surfaces are substantially perpendicular to the axis of the hub 12. It should be noted that so far as the mechanical interaction of the rotor 10 with the wheel and disk brake assembly is concerned, it is contemplated that this will be conventional and well-known to those skilled in the art. Thus, for the purpose of clarity, only one pair of brake pads 24 and 26 and a hydraulically actuated caliper 28 are shown, it being understood that many variations in the form and number of the pairs of pads exist depending on the particular assembly with which the rotor 10 is used.

As shown in FIG. 2, the pads 24 and 26 are disposed adjacent each of the surfaces 20 and 22 and are ordinarily moved convergingly by the caliper 28 to simultaneously dispose the surfaces 20 and 22 in frictional contact with rotor-contacting surfaces 30 and 32, respectively, of the pads 24 and 26, thereby providing the desired braking force. It is noted that the pads 24 and 26 are typically annular segments shaped to substantially correspond to the shape of the disk 14. Usually, the pads 24 and 26 encompass about 70 degrees of the circumference of the disks but may vary in this respect from about 15 degrees to about 300 degrees. Also, the radial dimension of the rotor-contacting surfaces 30 and 32 of the pads 24 and 26 is usually approximately that of the radial dimension of the surfaces 20 and 22 so that frictional contact between the surfaces 30 and 32 of the pads and the surfaces 20 and 22 occurs across substantially the entire radial element of the surfaces 20 and 22 as the rotor 10 rotates and the pads 24 and 26 are applied to the disk 14.

A plurality of spaced-apart depressions 34 are provided on the braking surfaces 20 and 22 of the disk 14. In a preferred embodiment of the invention, the depressions 34 are in the form of uniformly dimensioned circular openings extending through the disk 14 between the surfaces 20 and 22. The depressions 34 are dimensioned and arranged so that the rotor-contacting surfaces 30 and 32 of the pads 24 and 26 cross at least one of the depressions 34 on the braking surfaces 20 and 22 at substantially all points on the rotor-contacting surfaces 30 and 32 as the rotor 10 turns on the hub axis and the pads are applied to the surfaces 20 and 22 to provide the braking force. It has been found that metal deforming on the surfaces 20 and 22 or separating therefrom as a result of frictional contact between the rotor-contacting surfaces 30 and 32 of the pads and the surfaces 20 and 22 is moved into the depressions 24 under the influence of the pads as they cross the depressions 24 to minimize the adverse effects of galling on the surfaces. This is illustrated diagrammatically in FIG. 3 in regard to the metal deformation aspect of the galling problem addressed by the invention. As shown, the pad 24 is depicted moving on the surface 20 in the direction of arrow 36, the friction between the two resulting in a metal deformation 38 shown as a small hump or wave forming in advance of the moving pad 24. As the pad 24 crosses the depression 34 in the surface 20, the deformation 38 is moved into the depression 34 under the influence of the pad 24 to form a deposit or bead 40 in the depression 34.

Although not shown in FIG. 3, it is further noted that the depressions 34 are effective to minimize or eliminate the accumulation of loose metal between the pads 24 and 26 and the surfaces 20 and 22 which can occur as a result of galling. In this regard, it has been observed that metal separates from the braking surfaces on a stainless steel rotor which is formulated and treated to provide an adequate braking action. Often, the metal peels from the rotor surfaces and rolls up in spherical formations which then detach from the surfaces and remain between the surfaces and the pads acting as a dry lubricant to significantly diminish the effectiveness of the brakes. A significant number of these spherical formations remain between the pads and the surfaces and grow in size, eventually rendering the brakes substantially inoperative. The depressions 34 minimize or eliminate this problem since the separated metal is moved into the depressions 34 under the influence of the pads as they cross the depressions 34 before the separated metal accumulates to a significant level between the pads and the surfaces, minimizing the adverse consequences thereof as previously noted.

Preferably, the depressions 34 are provided in three separate groups. As shown in FIG. 1, a first group of depressions includes substantially diametrically opposed depressions 42 located adjacent the radially innermost portion of the surfaces 20 and 22. A second group includes substantially diametrically opposed depressions 44 which are circumferentially spaced about 60 degrees from the first group and located at a greater radial distance from the hub axis than the first group, preferably at locations that are radially centered on the surfaces 20 and 22. A third group includes substantially diametrically opposed depressions 46 which are circumferentially spaced about 60 degrees from the second group and located adjacent the radially outermost portion of the surfaces 20 and 22. Thus, each group is circumferentially offset from the other groups by about 60 degrees and radially spaced depressions 42, 44, and 46 in the first, second, and third groups are crossed in succession by the rotor-contacting surfaces 30 and 32 of the pads 24 and 26 as they move across the surfaces 20 and 22.

The dimension of the depressions 42, 44, and 46 is preferably selected so that the pads 24 and 26 cross a depression at substantially all points on their rotor-contacting surfaces 30 and 32 during each half revolution of the rotor 10. In this regard, the combined diameters of any three depressions 42, 44, and 46 is preferably at least as large as the radial dimension of the portion of the surfaces 20 and 22 which is contact with the rotor-contacting surfaces 30 and 32 of the pads. That is, if the three depressions 42, 44, and 46 were aligned with their centers on a ray emanating from the hub axis, the depressions would touch each other and would preferably overlap to some extent. For example, in one form of the invention, the portion of the braking surfaces 20 and 22 in contact with the pads has a radial dimension of about 1.0 inch and the combined diameters of the depressions 42, 44, and 46 (one each) is about 1.125 inches. Again, all the depressions preferably have the same diameter and thus in the form of the invention noted have a diameter of about 0.375 inches each.

A preferred method for manufacturing the rotor 10 includes forming a mold from which a wax model can be produced in the general configuration of the rotor 10 as described above. Preferably, the mold is configured so that the wax model does not include the depressions 34 and bolt holes 18 since it is preferred that they be drilled following casting of the rotor 10. This is the case at least where the depressions 34 are circular openings extending through the disk 14. However, it is contemplated that the depressions 34 may take on other forms which may affect the manner in which the wax model is formed. For example, the depressions 34 may extend only partially into the braking surfaces 20 and 22, be oblong, slotted, or have a number of different shapes, and it may be advantageous in such cases to provide for the depressions 34 in the molding process.

The mold is configured so that the wax model will include a plurality of sprue knobs symmetrically positioned around the disk 14. Any number of sprue knobs may be provided although it is preferred to use three to eight, with five to seven being most preferred. The symmetrical arrangement and number of sprue knobs are considered important in that it has been found that the stainless steel melt in such circumstances tends to solidify with reduced internal stresses which minimizes warpage, and also gives a more weight balanced part which is easier to machine.

The wax may be of any natural or synthetic material such as low molecular weight polyethylene which is readily fusible and which is sufficiently rigid on cooling to support ceramic material during final preparation of a ceramic mold. This wax molding operation and the subsequent formation of the final ceramic mold therefrom are well-known to the art of "shell investment casting" and need not be described herein.

After the ceramic shell has been formed or during forming thereof, the sprue holes are provided therein at the location of the sprue knobs on the wax model. When the wax has been melted out of the ceramic shell, the molten stainless steel is poured in through the sprue holes and allowed to cool. The ceramic shell is then removed (broken away) from the casting and the casting is solution treated and age hardened before machining.

The stainless steel preferred herein includes the following elements in the indicated weight percentages: Carbon—about 0.06 maximum; Manganese—about 0.70 maximum; Phosphorus—about 0.04 maximum; Sulfur—about 0.03 maximum; Silicon—from about 0.50 to about 1.00; Chromium—from from about 15.5 to about 16.7; Nickel—from about 3.6 to about 4.6; Copper—from about 2.5 to about 3.5; Nitrogen—about about 0.05 maximum; and a Columbium and Tantalum mixture in a total percentage from about 0.10 to about 0.40. The remaining percentage of the steel is, of course, made up essentially of Iron. A suitable alloy providing the above composition is the martensitic alloy sold under the trademark ARMCO 17-4 PH by Armco, Inc. of Middletown, Ohio and described in the product data brochure designated LSS-4182 of Armco Steel Corporation, Stainless Steel Division, designated LSS-4182 of June, 1982. The steel is solution treated and age-hardened following casting to obtain a steel which has a minimum tensile strength of about 125,000 p.s.i. and a Rockwell Hardness of about 30 to about 42, preferably about 30 to about 35. The solution treatment includes heating at about 1900° F. to about 1925° F. for 15 minutes to one hour so that the copper, the precipitation-hardening agent, will dissolve in the austenite. The alloy is then cooled in air or oil to 70° F. or lower to transform the austenite to martensite producing a "soft martensite" that is supersaturated with copper. The age-hardening treatment includes heating at a temperature in the range of from about 925° F. to about 1100° F. for at least 90 minutes. Preferably, the age-hardening is performed at a temperature in the range of about 1050° F. to about 1100° F. to obtain a steel having a Rockwell Hardness in the order of 30 to 35.

Final machining operations are performed on the treated and hardened rotor casting to dimension and smooth the critical parts and to drill out the bolt holes 18 and depressions 24 at the indicated locations. It is noted that due in large measure to the symmetry and number of sprue holes, uneven cooling rate which may result in internal stresses and distortion of the rotor casting is minimized allowing for much easier finish machining so that exact dimensions and rotor balance can be obtained.

According to the previously described embodiment of the present invention, it has been found that a rotor formed of stainless steel provides a suitable braking action when the steel has a preferred Rockwell Hardness of about 30 to about 35. That is, the softer metal is preferred since it provides a greater degree of frictional contact between the braking surfaces and the brake pads. Previously, these softer stainless steels had been found unsuitable because of the adverse effects of galling or metal deformation and separation on the braking surfaces. However, it has been discovered according to the present invention that these adverse effects can be greatly reduced or eliminated through the provision of the previously described depressions 34 on the stainless steel braking surfaces making it possible to utilize a stainless steel that provides a suitable braking action. As a result, advantage may be taken of the excellent corrosion resistance of stainless steel in aviation applications.

It is particularly noted that the depressions 34 provide a means by which metal that is deformed on the braking surfaces or is separated therefrom as a result of galling can be effectively removed from the surfaces without significantly affecting braking efficiency. Thus, the invention promotes maintenance of the braking surfaces in their intended planar configuration and insures that maximum contact is maintained between the pads and the braking surface at all times. Furthermore, in accordance with the preferred embodiment, metal is moved into the depressions 24 under the influence of the pads during at least each half revolution of the disk 14, insuring against build up of deformed metal to an undesirable level as well as limiting the accumulation of loose metal to a minimal amount. Again in the preferred embodiment, radial and circumferential spacing of the various groups of depressions 34 in relation to the other groups is believed to be advantageous in that the metal builds up and accumulates in stages across the width of the pads and is moved into the depressions at circumferentially and radially spaced locations during each half revolution. This is thought to minimize frictional increases attendant the metal deformation and separation process, and produce an essentially constant and smooth rate of build up or accumulation and removal of the metal. Furthermore, minimization or elimination of the adverse effects of galling in a stainless steel brake rotor for aviation use according to the present invention permits the use of stainless steel rotors of a dimension and weight that is compatible with existing airplane disk brake assemblies.

Although a preferred embodiment of the present invention has been described in the foregoing detailed description, it will be understood by those of ordinary skill in the art that the invention is capable of numerous rearrangements, modifications and substitutions without departing from the spirit and scope of the invention as set forth in the appended claims.

What is claimed is:

1. A brake rotor for use in an airplane wheel and disk brake assembly having brake pads with rotor-contacting surfaces which interact with the brake rotor to provide a braking force, said brake rotor comprising a hub for connecting said rotor to the wheel for rotation therewith about a hub axis, a disk connected to said hub and defining substantially planar annular braking surfaces on opposite axial sides thereof for frictionally contacting the rotor-contacting surfaces of the brake pads to provide the braking force, said hub and disk being integrally formed of stainless steel that has a minimum tensile strength of about 120,000 p.s.i. and Rockwell Hardness of from about 30 to about 42, and a plurality of spaced-apart depressions provided on said braking surfaces and being dimensioned and arranged so that the rotor-contacting surfaces of the pads cross at least one of said depressions on said braking surfaces at substantially all points on the rotor-contacting surfaces of the pads during rotation of said rotor about said hub axis, whereby metal that is deformed on said braking surfaces or is separated therefrom as a result of frictional contact between the rotor-contacting surfaces of the pads and said braking surfaces is moved into said depressions under the influence of the pads as they cross said depressions to minimize the adverse effects of galling on the stainless steel braking surfaces.

2. The rotor of claim 1, wherein said stainless steel has a Rockwell Hardness of about 30 to about 35.

3. The rotor of claim 1 or 2, wherein said depressions are dimensioned and arranged so that the rotor-contacting surfaces of the pads cross at least one of said depressions on said braking surfaces at substantially all points on the rotor-contacting surfaces of the pads at least twice during each revolution of said rotor about said hub axis.

4. The rotor of claim 1 or 2, wherein said depressions comprise circular openings which extend axially through said disk from one of said braking surfaces to the other, and each of said openings is circumferentially spaced approximately 60 degrees from adjacent openings about said hub axis.

5. The rotor of claim 1 or 2, wherein said depressions comprise at least first and second groups of depressions, each group including at least two depressions which are regularly spaced circumferentially on the braking surfaces and located at substantially the same radial distance from said hub axis, said depressions in each group being substantially equally spaced circumferentially from adjacent depressions in the other groups and being located at a radial distance from said hub axis that is different than the radial distance of said depressions in the other groups.

6. The rotor of claim 1 or 2, wherein said depressions comprise first, second and third groups, each of which has two substantially diametrically opposed depressions, said diametrically opposed depressions in said first group being disposed adjacent the radially innermost portion of said disk, said diametrically opposed depressions in said third group being disposed adjacent the radially outermost portion of said disk, said diametrically opposed depressions in said third group being diposed at locations that are substantially radially intermediate said diametrically opposed depressions in said first and second groups, and each of said depressions on said braking surfaces being circumferentially spaced from adjacent depressions approximately 60 degrees and said depressions being configured to provide that the rotor-contacting surfaces of the pads cross at least one of said depressions on said braking surfaces at substantially all points on the rotor-contacting surface of the pads at least once during each half revolution of said hub about said hub axis.

7. The rotor of claim 6, wherein said depressions comprise substantially uniformly dimensioned circular openings which extend axially through said disk from one of said braking surfaces to the other.

* * * * *